United States Patent
Chujo et al.

(10) Patent No.: US 7,856,173 B2
(45) Date of Patent: Dec. 21, 2010

(54) SHOOTING DEVICE FOR ELECTRICAL IMAGE STABILIZING USING RELATIONSHIP BETWEEN STABILIZATION INFORMATION AND SHOOTING CONDITION

(75) Inventors: Kaoru Chujo, Kawasaki (JP); Masayoshi Shimizu, Kawasaki (JP); Takashi Wakamatsu, Kawasaki (JP); Masayuki Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 598 days.

(21) Appl. No.: 11/385,652

(22) Filed: Mar. 22, 2006

(65) Prior Publication Data

US 2007/0071426 A1 Mar. 29, 2007

(30) Foreign Application Priority Data

Sep. 27, 2005 (JP) ............................. 2005-280155

(51) Int. Cl.
 *G03B 5/00* (2006.01)
 *H04N 5/228* (2006.01)
(52) U.S. Cl. .................. 396/55; 348/208.4; 348/208.6; 348/208.13
(58) Field of Classification Search .............. 396/52–55
 See application file for complete search history.

(56) References Cited

U.S. PATENT DOCUMENTS

| | | | | |
|---|---|---|---|---|
| 5,371,539 A | | 12/1994 | Okino et al. | 348/207 |
| 5,867,213 A | * | 2/1999 | Ouchi | 348/208.5 |
| 6,571,002 B1 | * | 5/2003 | Ogawa | 382/117 |
| 6,614,994 B2 | * | 9/2003 | Ohishi et al. | 396/55 |
| 6,687,458 B2 | * | 2/2004 | Masuda | 396/55 |
| 2004/0008772 A1 | * | 1/2004 | Kojima | 375/240.08 |
| 2004/0145673 A1 | * | 7/2004 | Washisu | 348/364 |
| 2006/0029377 A1 | * | 2/2006 | Stavely et al. | 396/54 |

FOREIGN PATENT DOCUMENTS

| | | |
|---|---|---|
| JP | 3-131832 | 6/1991 |
| JP | 6-46315 | 2/1994 |
| JP | 10-161169 | 6/1998 |
| JP | 2001-346093 | 12/2001 |
| JP | 2001-346094 | 12/2001 |
| JP | 2001-347093 | 12/2001 |
| JP | 2002-16837 | 1/2002 |
| JP | 2002-333645 | 11/2002 |
| JP | 2004-248171 | 9/2004 |
| JP | 2005-26888 | 1/2005 |

OTHER PUBLICATIONS

English translation of office action dated Mar. 24, 2009 issued for the corresponding Japanese Application 2005-280155.*
Office Action dated Mar. 24, 2009 issued for the corresponding Japanese application No. 2005-280155.
Office Action dated Sep. 1, 2009 issued in corresponding Japanese patent application No. 2005-280155 with English translation.
Office Action dated Feb. 9, 2010 from Japanese Patent Appln. No. 2005-280155 with partial English translation.

\* cited by examiner

*Primary Examiner*—Jay M Patidar
(74) *Attorney, Agent, or Firm*—Kratz, Quintos & Hanson, LLP

(57) ABSTRACT

A shooting device includes a image sensor for capturing an image of a subject, a detection unit detecting stabilization information from the image, a stabilization information recording unit associating a shooting condition during shooting with the detected stabilization information and recording the shooting condition and the stabilization information, and an electronic image stabilization unit. The electronic image stabilization unit extracts the stabilization information corresponding to the shooting condition having a predetermined relationship with the shooting condition by referring to the stabilization information recording unit using the shooting condition, and stabilizes the shooting device shake based on the extracted stabilization information.

17 Claims, 13 Drawing Sheets

FIG. 6

| SHOOTING CONDITION | | | |
|---|---|---|---|
| SHOOTING BUTTON INFORMATION | SHOOTING DIRECTION INFORMATION | CONTINUOUS SHOOTING INTERVAL | EXPOSURE TIME |

| STABILIZATION INFORMATION | | | |
|---|---|---|---|
| DISPLACEMENT WIDTH | DISPLACEMENT DIRECTION | DISPLACEMENT SPEED | TYPE OF DISPLACEMENT |

FIG. 7

| No. | EXPOSURE TIME (msec) | SHOOTING DIRECTION | AF FUNCTION | DISPLACEMENT WIDTH (pixels) | TYPE OF DISPLACEMENT |
|---|---|---|---|---|---|
| 1 | 200 | VERTICAL | USED | 20 | SHIFT |
| 2 | 50 | VERTICAL | UNUSED | 3 | SHIFT |
| 3 | 0.5 | HORIZONTAL | USED | 0 | SHIFT |
| 4 | 350 | HORIZONTAL | UNUSED | 25 | ROTATION |
| 5 | 255 | HORIZONTAL | USED | 21 | SHIFT |
| 6 | 542 | VERTICAL | USED | 40 | SHIFT |
| 7 | ... | ... | ... | ... | ... |
| 8 | ... | ... | ... | ... | ... |
| 9 | ... | ... | ... | ... | ... |
| 10 | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |

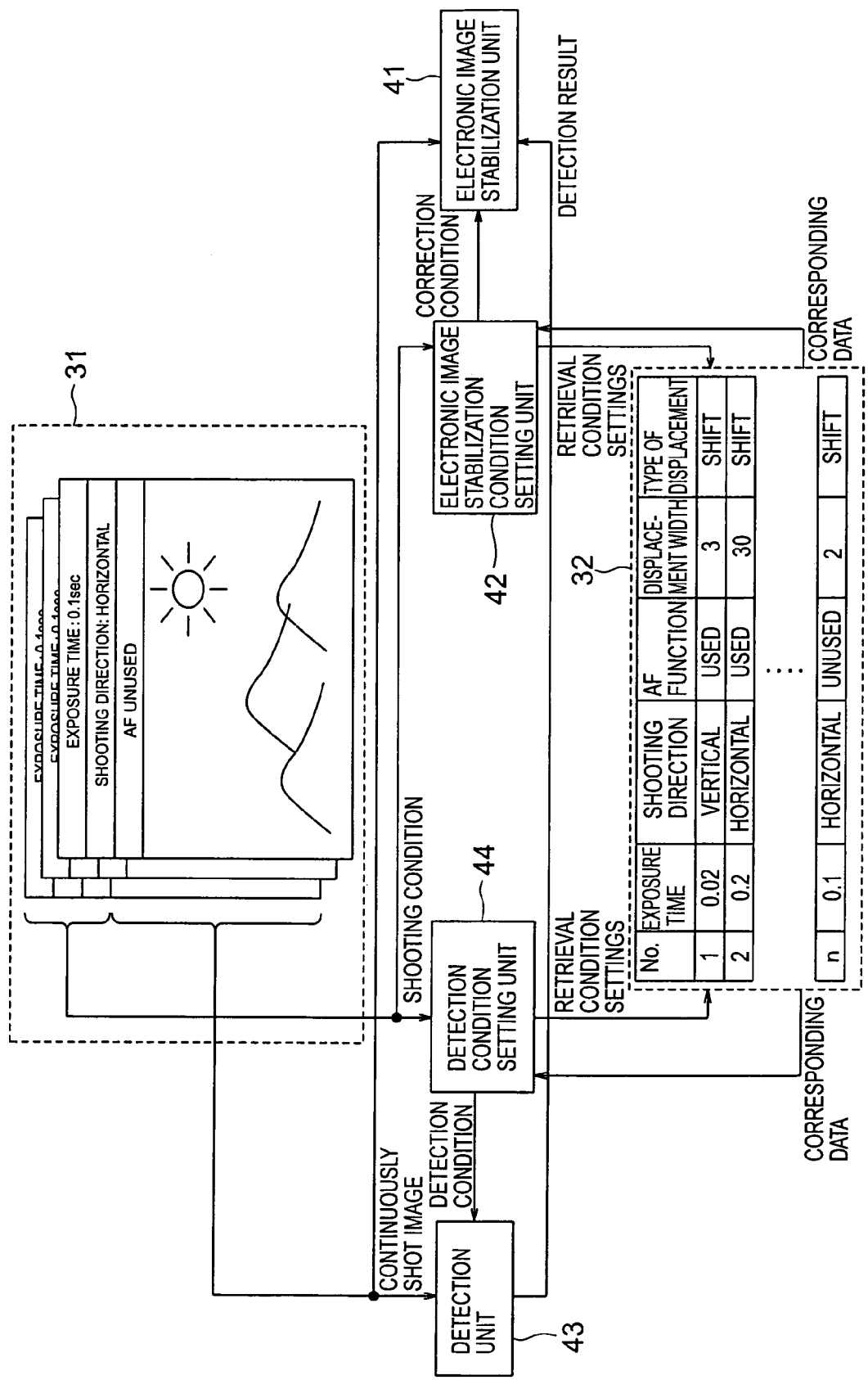

FIG. 13A

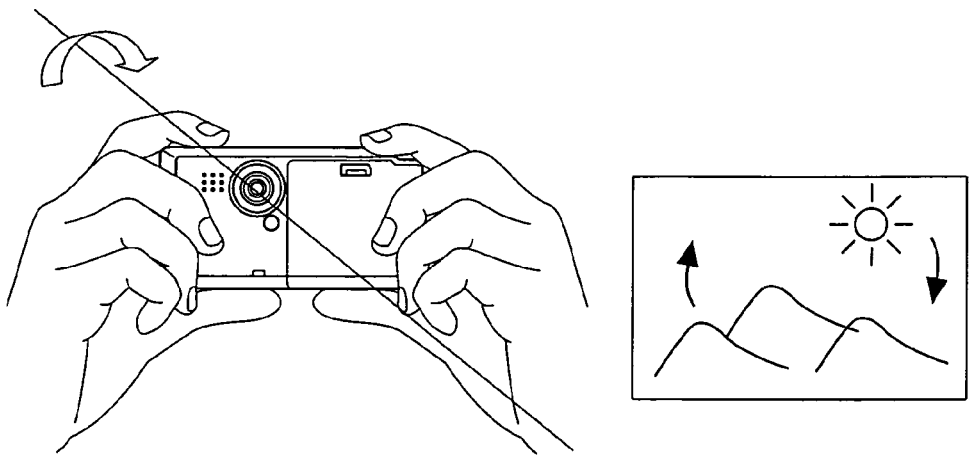

DISPLACEMENT BY ROTATION INDICATED BY ↷ HAS OCCURRED IN PRESENT SHOOTING ON AXIS PERPENDICULAR TO LENS, AND DISPLACEMENT BY ROTATION INDICATED BY ↑↓ HAS OCCURRED IN UPPER RIGHT FIGURE. AMOUNT OF DISPLACEMENT EXCEEDS YOUR AVERAGE VALUE.

FIG. 13B

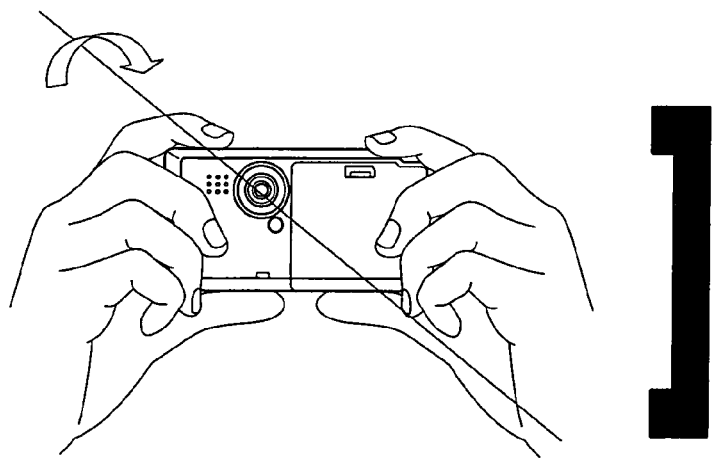

HOLD TIGHT RIGHT SIDE PORTION ] OF SHOOTING DEVICE, AND BE CAREFUL NOT TO GENERATE DISPLACEMENT BY ROTATION IN DIRECTION INDICATED BY ↷

SHOOTING DEVICE FOR ELECTRICAL IMAGE STABILIZING USING RELATIONSHIP BETWEEN STABILIZATION INFORMATION AND SHOOTING CONDITION

CROSS-REFERENCE TO RELATED APPLICATIONS

This application claims the conventional priority based on Japanese Application No. 2005-280155, filed on Sep. 27, 2005, the disclosures of which are incorporated herein by reference.

BACKGROUND OF THE INVENTION

1. Field of the Invention

The present invention generally relates to a shooting device, a electronic image stabilization method, and a electronic image stabilization program, and more specifically to a shooting device, a electronic image stabilization method, and a electronic image stabilization program customized to the individuality of a user and a shooting environment especially for stabilization of shooting device shake such as camera shake.

2. Description of the Related Art

A shooting device such as a digital (still) camera, video camera and so on (hereinafter referred to as a shooting device) has made rapid improvement for a higher pixel resolution, higher zoom magnification, smaller, and lighter unit. However, the improvement in these functions and conveniences causes shooting device shake such as camera shake. Especially, with a shooting device such as a camera provided on a portable telephone, images are often shot at very dark places, and the shooting device is not provided with a flash in many cases, thereby easily causing the shooting device shake (the camera shake, for example) as compared with a normal shooting device (a camera, for example).

A countermeasure against the shooting device shake is an optical stabilization method and a stabilization method by digital processing. In a normal field of shooting devices, an optically stabilizing method is adopted for marketed products.

However, the characteristic (frequency and rotation direction) of shooting device shake when a subject is shot by a shooting device depends on each user, the shape of the shooting device, and the use of a shooting device by the user. For example, the characteristic of shooting device shake largely depends on the age, sex, hand size, force of a hand holding a shooting device and so on of a user. When a portable telephone is provided with a shooting device such as a camera, the method of holding the shooting device may be different between a portrait format and a landscape format. In a shooting device such as a camera, the position of a shutter button normally depends on whether or not an autofocus (AF) function is to be used. Also in this case, the characteristic of screen depends each condition.

Therefore, when a electronic image stabilization is made as a shooting device shake stabilizing function for a shooting device shake characteristic anticipated for general users, the optimum electronic image stabilization cannot be made for each user. That is, since the stabilization characteristic (frequency and rotation direction) of shooting device shake is not suitable for a specific user, a desired electronic image stabilization effect cannot be obtained, an unnatural stabilization can be made to a shot image, or an unnecessarily long time is required for a stabilization. As a result, the user cannot acquire a successful effect of a function of stabilizing the shooting device shake, a resultant shot image shows an unnatural impression, and the user may have the stress of wasting a long time in stabilizing an image.

To solve the above-mentioned problems, there is a method proposed for obtaining shooting device shake frequency information when the user holds a capture device for a predetermined time at a shop when he or she purchases a capture device for a video movie and the like, transferring the information to the manufacturer of the device, generating by the manufacturer the shake control information specific to the frequency, writing the control information to the capture device, and then selling the device to the user (for example, refer to patent document 1: Japanese Patent Laid-open No. 2001-346094).

The shooting device shake characteristic of a user depends not only on the individuality of a user such as the user age, sex, hand size, force of a hand holding a shooting device and so on as described above but also on the shooting condition such as the brightness during shooting, exposure time (environment), a shooting device holding method, the position of a shutter button and so on. Therefore, the electronic image stabilization cannot be optimized depending on the individuality of a user and a shooting environment only by the shooting device shake frequency obtained within a limited time under the limited environment in a shop. That is, it is hard to customize the electronic image stabilization to widely respond to various types of shooting device shake caused in various environmental conditions.

SUMMARY OF THE INVENTION

It is an object of the present invention to provide a shooting device to optimize a electronic image stabilization corresponding to the shooting device shake characteristic unique to a user and a shooting environment.

It is another object of the present invention to provide a electronic image stabilization method for optimizing a electronic image stabilization corresponding to the shooting device shake characteristic unique to a user and a shooting environment.

It is still another object of the present invention to provide a electronic image stabilization program to optimize a electronic image stabilization corresponding to the shooting device shake characteristic unique to a user and a shooting environment.

The shooting device and the electronic image stabilization apparatus according to the present invention comprises a capture unit capturing an image of a subject, a detection unit detecting stabilization information from the image, a stabilization information recording unit associating a shooting condition during shooting with the detected stabilization information and recording the shooting condition and the stabilization information, and a electronic image stabilization unit extracting the stabilization information corresponding to the shooting condition having a predetermined relationship with the shooting condition by referring to the stabilization information recording unit using the shooting condition, and stabilizing the shooting device shake based on the extracted stabilization information.

Preferably, the shooting device according to the present invention further comprises a control unit controlling the capture unit, a image processing unit recording the image shot by the capture unit in the image recording unit, and an image recording unit recording an image. The capture unit continuously shoots a plurality of images under the control of the control unit. The image processing unit records the plurality of continuously shot images in the image recording unit. The detection unit detects stabilization information from the plurality of images recorded among the image recording unit. The electronic image stabilization unit stabilizes the shooting device shake on at least one image among the plurality of images based on the stabilization information.

Preferably, in the shooting device according to the present invention, the electronic image stabilization unit extracts a plurality of stabilization information from the stabilization information recording unit using a shooting condition, and stabilizes the shooting device shake based on the plurality of extracted information.

The electronic image stabilization method according to the present invention is a method for stabilizing shooting device shake. The electronic image stabilization method comprises shooting an image of a subject, detecting stabilization information from the image, associating a shooting condition during the shooting with the detected stabilization information and recording the shooting condition and the stabilization information, extracting the stabilization information corresponding to the shooting condition having a predetermined relationship with the shooting condition using the shooting condition, and stabilizing the shooting device shake based on the extracted stabilization information.

The electronic image stabilization program according to the present invention is a program for stabilizing shooting device shake. The program causes a computer to execute shooting an image of a subject, detecting stabilization information from the image, associating a shooting condition during the shooting with the detected stabilization information and recording the shooting condition and the stabilization information, extracting the stabilization information corresponding to the shooting condition having a predetermined relationship with the shooting condition using the shooting condition, and stabilizing the shooting device shake based on the extracted stabilization information.

In the shooting device and in the electronic image stabilization apparatus, the shooting device shake stabilizing method, and the electronic image stabilization program, not only the stabilization information, but also the shooting condition during shooting is used in stabilizing shooting device shake. Thus, according to the present invention, shooting device shake can be stabilized based on both of the stabilization information and the shooting condition. For example, corresponding to the stabilization information such as the user age, sex, hand size, force of a hand holding a shooting device and so on, the shooting device shake can be stabilized, and also corresponding to the shooting condition such as the environment during shooting (brightness and exposure time), the method of holding a shooting device, the position of a shutter button and so on, the shooting device shake can be stabilized. As a result, shooting device shake which cannot be stabilized in the electronic image stabilization process for general users can be stabilized, thereby the electronic image stabilization customized (specified or optimized) to the individuality of the shooting device shake of a user under various shooting conditions can be performed, and the effect of the electronic image stabilization under various shooting conditions can be maximized (optimized).

The shooting device according to the present invention detects stabilization information based on a plurality of images obtained by continuous shooting, and stabilizes shooting device shake on at least one image among the plurality of images. Thus, electronic image stabilization can be performed by a comparatively easy process using a plurality of continuously shot images without adopting an optically stabilizing method.

Additionally, the shooting device according to the present invention extracts a plurality of stabilization information from a stabilization information recording unit, and stabilizes shooting device shake based on the plurality of extracted stabilization information. Thus, the electronic image stabilization can be changed corresponding to the result of the shooting device shake in the past shooting of a user, for example, the average value of the stabilization information. As a result, under various shooting conditions, the optimized (customized) electronic image stabilization most suitable for the individuality of the user and shooting conditions can be performed.

As described later, the shooting device according to the present invention can change the range of detecting shooting device shake, the range of stabilization (electronic image stabilization), the sequence of detecting shooting device shake, and the sequence of electronic image stabilizations. Thus, the electronic image stabilization customized to the user can be performed, and the effect of the electronic image stabilization can be maximized.

The shooting device according to the present invention records at least one of information among shooting button information, shooting direction information, a continuous shooting interval, and an exposure time as a shooting condition. Thus, the electronic image stabilization can be changed corresponding to the shooting condition. As a result, the electronic image stabilization customized corresponding to various kind of stabilization information can be performed, and the effect of the electronic image stabilization can be maximized.

Furthermore, the shooting device according to the present invention records at least one piece of information among a width of shooting device shake, a direction of shooting device shake, a speed of shooting device shake, and a type of shooting device shake as stabilization information. Thus, the electronic image stabilization can be changed according to the stabilization information. As a result, the electronic image stabilization customized corresponding to various stabilization information can be performed, thereby the effect of the electronic image stabilization can be maximized.

BRIEF DESCRIPTION OF THE DRAWINGS

FIGS. 6 and 7 are explanatory views of a stabilization information recording unit.

FIGS. 8 and 9 are explanatory views showing detecting and stabilizing shooting device shake.

FIGS. 13A and 13B are explanatory views of the guidance of shooting device shake.

DETAILED DESCRIPTION OF THE PREFERRED EMBODIMENTS

Figure 1:
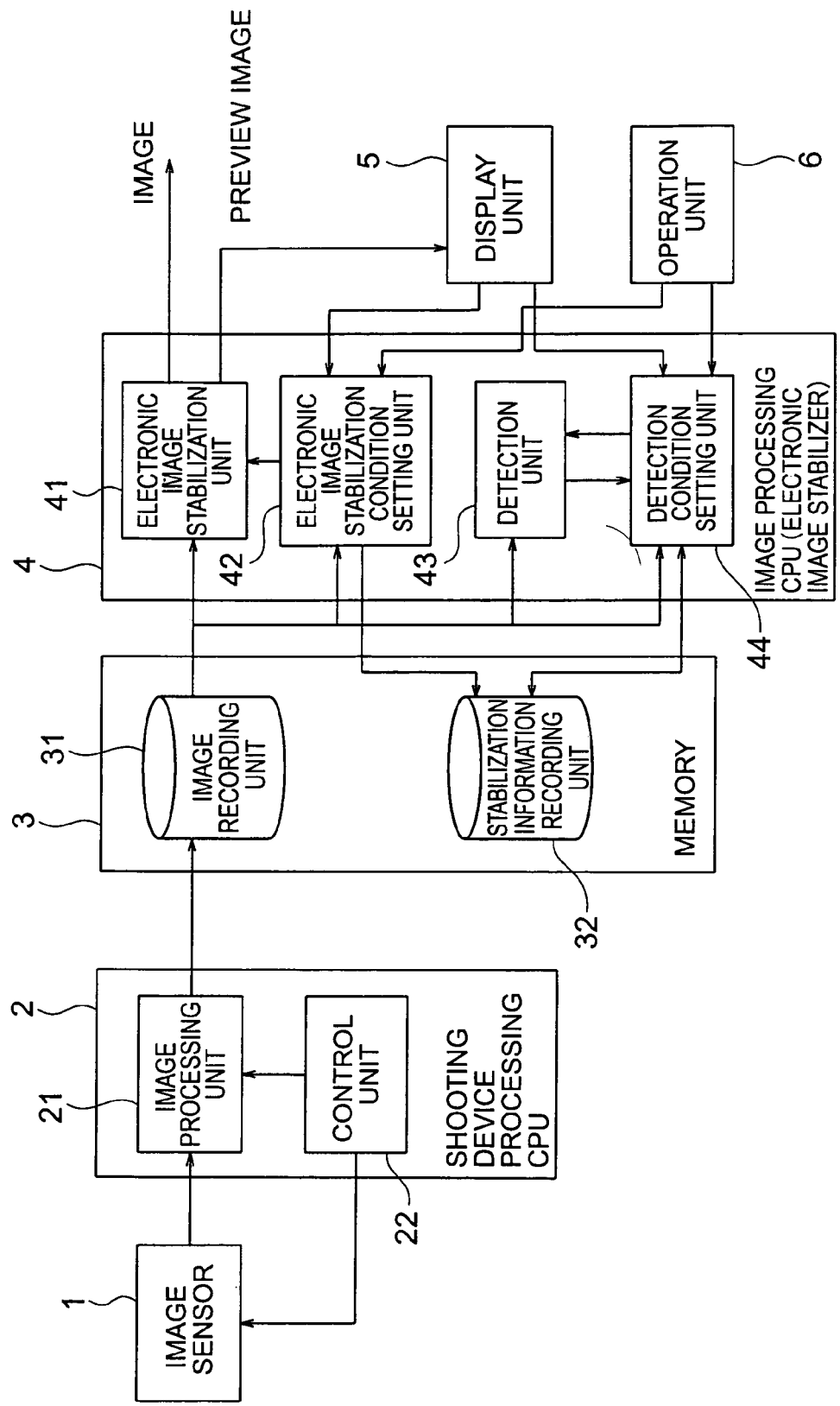
FIG. 1 shows an example of a structure of a shooting device according to the present invention.

FIG. 1 shows a structure of a shooting device (or an electronic image stabilization apparatus) such as a digital camera, or an example of the structure of the shooting device such as a digital camera according to the present invention. The shooting device includes an image sensor 1, a shooting device processing CPU (central processing unit) 2, for example, memory 3 including, for example, flash memory, an image processing CPU 4, a display unit 5 including an LCD (liquid display device), and an operation unit 6.

The shooting device processing CPU 2 includes, as well known, a image processing unit 21 for recording in an image recording unit 31 an image obtained by performing necessary camera image processing as image processing on the image shot by the image sensor 1, and a control unit 22 for controlling the image sensor 1. The memory 3 includes the well-known image recording unit 31 for recording the image and a stabilization information recording unit 32. The stabilization information recording unit 32 records a shooting condition and detected stabilization information. The image processing CPU 4 includes an electronic image stabilization unit (hereinafter referred to as a stabilization unit) 41, a electronic image stabilization condition setting unit (hereinafter referred to as a stabilization condition setting unit) 42, a detection unit 43, and a detection condition setting unit 44.

The shooting device processing CPU 2 performs well-known camera processing as shooting device processing. Under the control of the control unit 22, the image sensor 1 shoots, that is, captures, an image of a subject. The image is a static image (also in this specification). The image signal captured by the image sensor 1 is A/D converted by an A/D converter (not shown in the attached drawings), and inputted to the image processing unit 21 as a digital signal. The image processing unit 21 performs well-known camera image processing as image processing. That is, the image processing unit 21 performs an AWB processing for automatically setting white balance and color processing on image data, and performs zoom processing in digital zoom as necessary. Thus, the image processing unit 21 generates a shot image (hereinafter referred to as an image) based on the image signal captured by the image sensor 1, and records the image in the image recording unit 31 as shown in FIG. 1.

For shooting an image by the image sensor 1 according to the operation of the operation unit 6 by a user, the control unit 22 controls the exposure (AE control) for automatically controlling exposure, controls shooting to perform continuous shooting at predetermined time intervals, controls autofocus (AF control) to automatically controlling the focus, and performs shooting control such as zoom control and so on. The control unit 22 holds the information about the control as a shooting condition, and transmits the information to the image processing unit 21.

Figure 2:
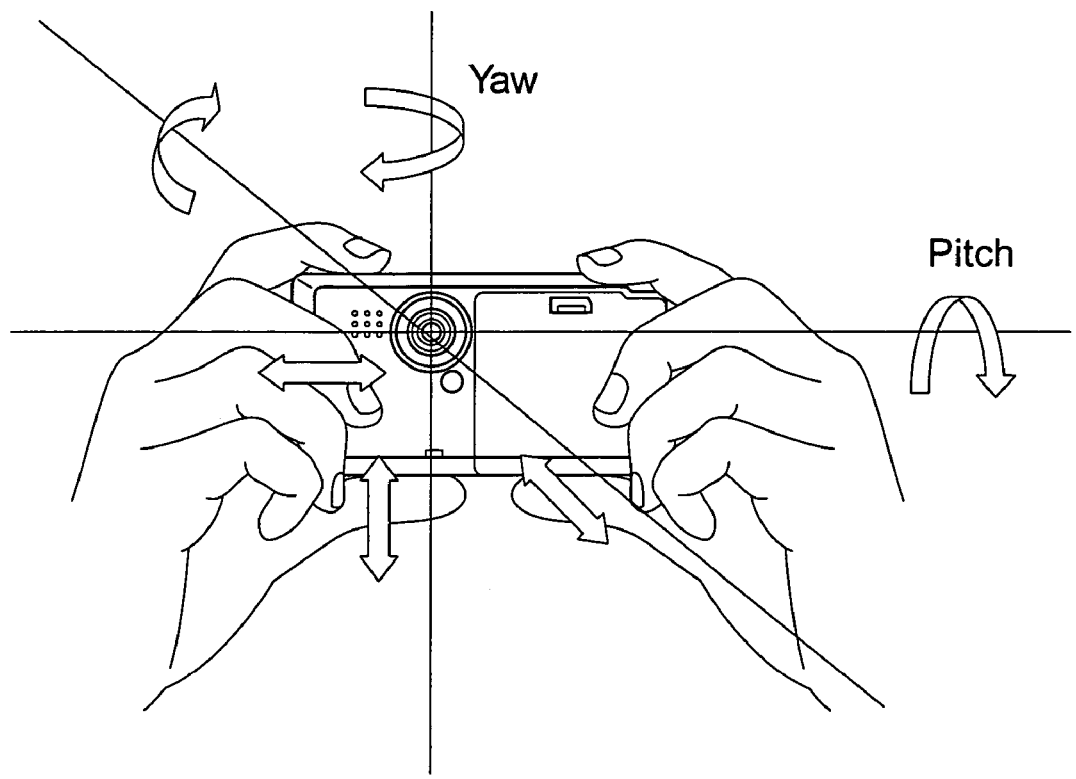
FIG. 2 is an explanatory view of shooting device shake.
Figure 3A:
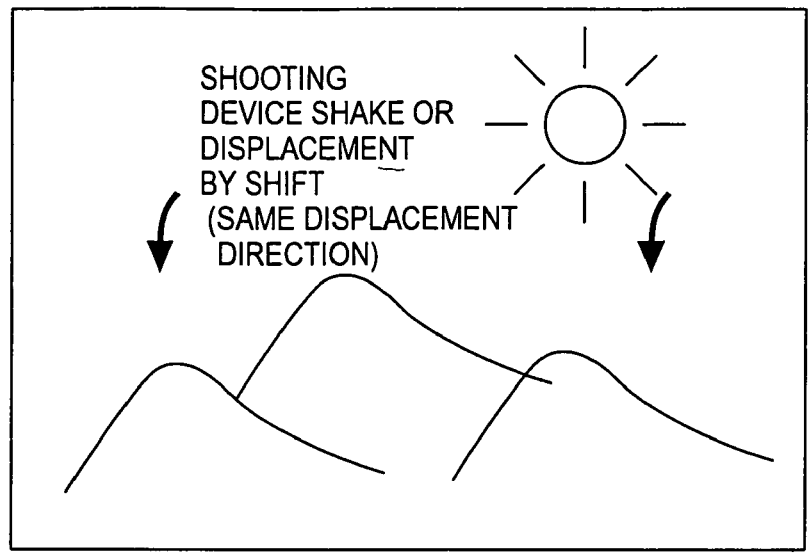
FIGS. 3A and 3B are explanatory views showing shooting device shake.
Figure 3B:
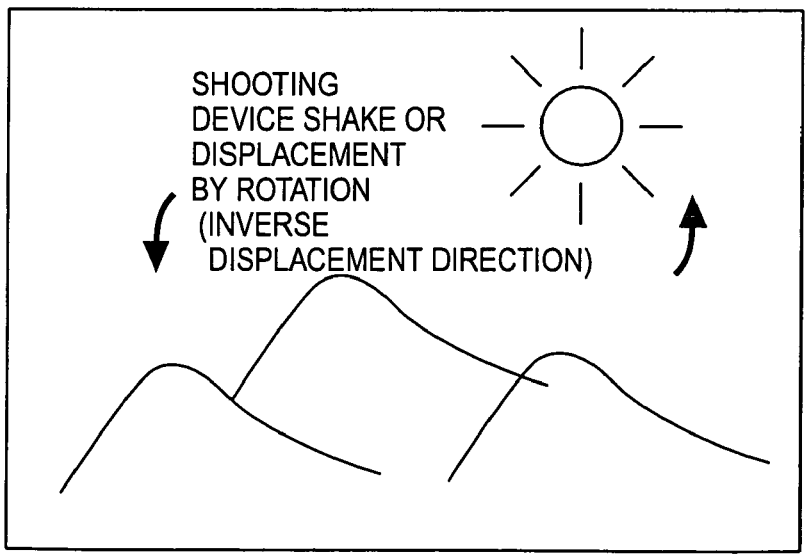

As the shooting device shake of a user during shooting, the six types of patterns shown in FIG. 2 can be anticipated. Among them, the shooting device shake by the rotation on the two axes (Yaw/Pitch) on the planes parallel to the lens (first case), and the shooting device shake by the rotation on the axis perpendicular to the lens (second case) occur the most frequently. In the first case, the shooting device shake on an image refers to shooting device shake with shift (or displacement by shift) as shown in FIG. 3A. In the second case, the shooting device shake on the image refers to shooting device shake with rotation (or displacement by rotation) as shown in FIG. 3B.

The characteristics of the shooting device shake such as the camera shake come from the shape of a shooting device such as a camera (the size and the form of a shooting device, the position of a shutter button and so on), and the shooting device shake characteristic such as the camera shake characteristic unique to the user of a shooting device. Relating to the customization of the portions depending on the shooting device shake, it is desired to discriminate users. Even the same user indicates different characteristics depending on the use of a shooting device. That is, the characteristics of shooting device shake depend on whether a shooting device is used in a landscape format (normal direction) or a portrait format, that is, depend on the shooting direction. Furthermore, since the position of the shutter button depends on whether or not autofocus (AF) is available, the same user indicates different characteristics of shooting device shake depending on whether or not the autofocus (AF) function is available.

In this example, the electronic image stabilization is customized, and the customization is performed for each user (for example, the owner of a shooting device). Since the position of the shutter button depends on whether or not the autofocus (AF) function is available as described above, it is determined whether or not the autofocus is used based on the fact that the position of the shutter button is different. The shooting direction (vertical or horizontal) is discriminated by well-known identification means.

Figure 4A:
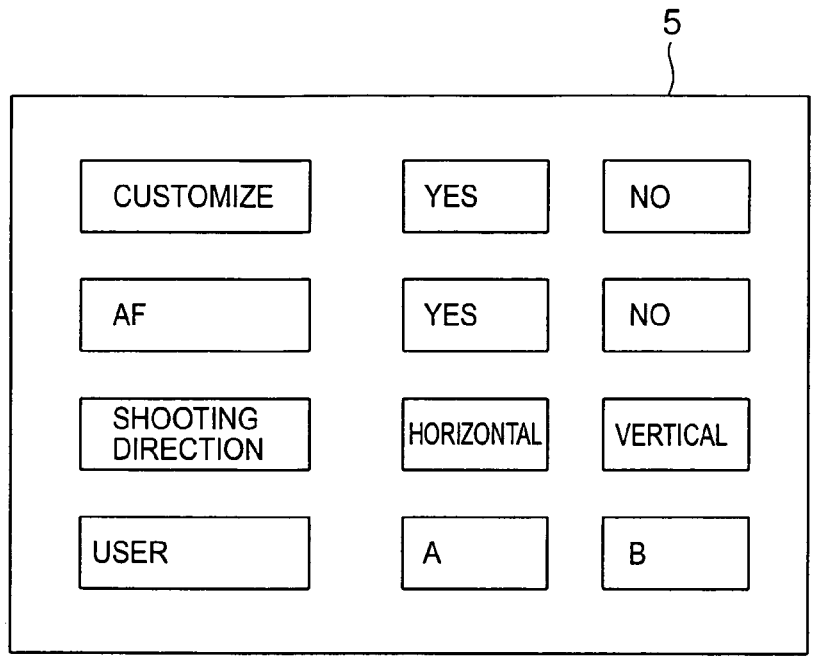
FIGS. 4A and 4B are explanatory views showing the input of a shooting condition.
Figure 4B:
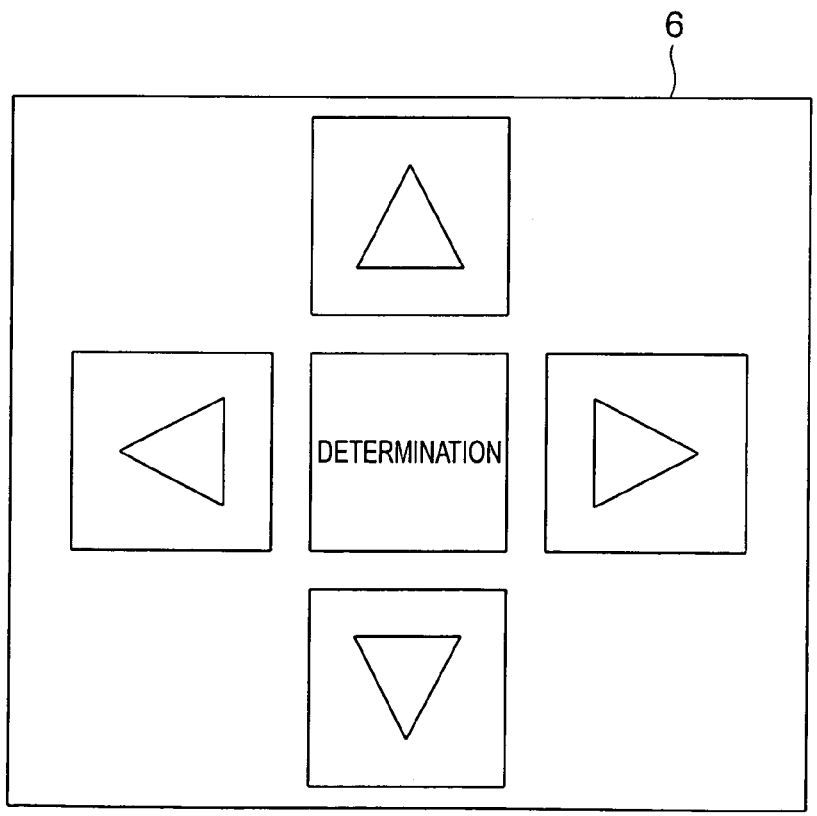

In this process, a user set interface can be provided. For example, before the image sensor 1 starts shooting an image, the user can be allowed to specify a shooting mode using the display unit 5 and the operation unit 6. FIGS. 4A and 4B respectively show examples of the display unit 5 and operation unit 6. For example, when a user selects input of a shooting condition from the menu (not shown in the attached drawings) displayed on the display unit 5, the screen on the display unit 5 is displayed. The user input the shooting condition at the time on the screen. The display unit 5 and the operation unit 6 are controlled by, for example, the control unit 22.

When the shooting device is customized relating to the electronic image stabilization, the user performs the following processes. That is, when the display unit 5 shown in FIG. 4A is displayed, the state of the inverse display of "customize" is entered. In this state, the user presses the "determine" button of the operation unit 6. Thus, "customize" is selected and inputted. Then, the user presses the "move right" button (the button in which the triangle pointing right) of the operation unit 6 and control is sent to "YES" button for inverse display. With the "YES" button set in the inverse display state, and the "determine" button is pressed. As a result, "YES" for "customize" is selected and inputted.

Other shooting conditions are similarly inputted. That is, the user presses the "move down" button (the button in which the triangle pointing down) of the operation unit 6, control is sent to the "AF" button for inverse display, and "YES"/"NO" of autofocus (AF) and the discrimination of the shooting direction (vertical/horizontal), and the discrimination of user (A, B) are similarly input. The user is registered in advance.

When "YES" is selected for customization, the electronic image stabilization is performed on the shot image, and it is customized (customization of stabilization information). When "NO" is selected for customization, the shot image is not stabilized against shooting device shake, and the electronic image stabilization is not customized.

Figure 5:
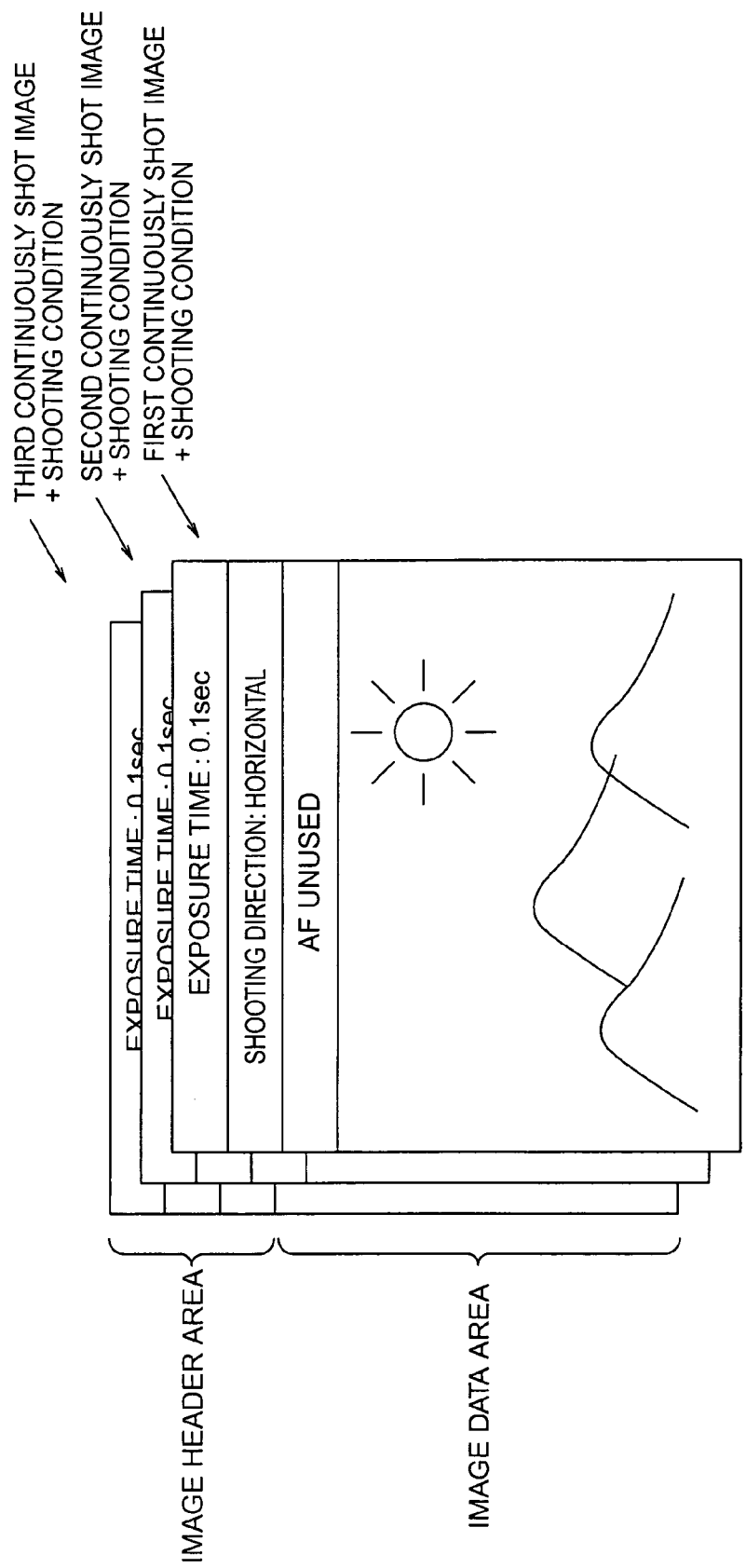
FIG. 5 is an explanatory view of an image recording unit.

Afterwards, depending on the press of a shutter button (not shown in the attached drawings) by a user, the image sensor 1 shoots an image. In this example, according to the present invention, the shooting device shake caused in the image recorded in the image recording unit 31 is stabilized using a plurality of images of a subject. When the customization is performed, the image sensor 1 continuously shoots a plurality (N) of images under the control of the control unit 22. After the image processing unit 21 performs the shooting device processing on the plurality of continuously shot images, for example, shooting conditions (exposure time, shooting direction, and whether AF is used or unused) are added to the header area of the image, and records (stores) the result in the image recording unit 31. FIG. 5 shows an example of the image information stored in the image recording unit 31.

The number N of shot images is 3 in this example. The three pieces of image data processed in the image processing unit 21 and the shooting conditions are stored in the image recording unit 31. The image on which the electronic image stabilization has been performed is one image generated by combining the three shot images. Therefore, the number of the resultant images and the images displayed on the display unit 6 by an instruction of the user of the shooting device (or outputted as electronic data) is one. The image as a stabilization result is outputted from the stabilization unit 41, and stored in the memory (not shown in the attached drawings) for storage of an image by an instruction of a user of the shooting device.

The image processing unit 21 stores the shooting condition at shooting in a part of image data as shown in FIG. 5. In this example, the exposure time, shooting direction information, and shooting button information are recorded in each piece of image data of the three shot images. The shooting button information indicates the difference between the positions of the shutter button, and also indicates whether or not the autofocus (AF) function has been used. As a shooting condition, it is possible to store at least one of the shooting button information, shooting direction information, continuous shooting interval, and exposure time (refer to FIG. 6). Furthermore, other information, for example, the zoom information can be recorded as a shooting condition.

A plurality of continuously shot image stored in the image recording unit 31 are inputted to each of the stabilization unit 41 and the detection unit 43. The detection unit 43 detects (generates) the stabilization information from the image stored in the image recording unit 31. As described above, a plurality of images (shot images) are used in the detection. The stabilization information is used for the electronic image stabilization of the image and the customization of the stabilization information. That is, the stabilization unit 41 stabilizes the shooting device shake on at least one image of the plurality of images based on the stabilization information. The detection unit 43 adds (writes) the stabilization information to the stabilization information recording unit 32. The image to be stabilized is a reference image for stabilization, and determined in advance (for example, the central image in the three consecutive images is determined as a reference image). Normally, only one image is stabilized, but other images can be stabilized.

FIG. 7 shows an example of a structure of the stabilization information recording unit 32. In this example, the stabilization information recording unit 32 records as shooting conditions the exposure time, shooting direction, and shooting button information (AF function), and records as the stabilization information, the width of shooting device shake (displacement width), type of shooting device shake (type of displacement). When an interface for selecting a user of the shooting device and so on is provided on the screen shown in FIG. 4A, it is possible to record the information and so on for each user of the shooting device. Thus, a plurality of stabilization information are not mixed between different users of the shooting device.

The detection unit 43 and the stabilization unit 41 refer to the stabilization information recording unit 32 respectively in the shooting device shake detecting process and the electronic image stabilization process. In the present invention, the stabilization information recording unit 32 associates the shooting condition during shooting with the detected stabilization information and records them. The stabilization unit 41 refers to the stabilization information recording unit 32 using the shooting condition obtained from the image recording unit 31, and extracts a plurality of stabilization information corresponding to the shooting conditions in a predetermined relationship with the corresponding shooting condition (in a predetermined range, and the same with the subsequent descriptions), thereby stabilizing the shooting device shake using the conditions (electronic image stabilization conditions) based on the extracted stabilization information.

The predetermined relationship refers to existing in a predetermined range of the shooting condition. A predetermined range refers to the statuses described below in the exposure time, shooting direction, shooting button information (AF function), which are the shooting condition. Relating to the exposure time, when the exposure time of the shooting condition is a central value, the range is the central value $\pm\alpha\%$. The value of $\alpha$ is empirically obtained, and can be, for example, 10 to 20. Relating to the shooting direction and the shooting button information, the range refers to being the same as the shooting direction and the shooting button information about the shooting condition. A practical example is described later.

Similarly, the detection unit 43 refers to the stabilization information recording unit 32 using the shooting condition, extracts a plurality of stabilization information corresponding to the shooting condition having a predetermined relationship with the shooting condition, and detects shooting device shake using the condition (detection condition) based on the detected stabilization information. Therefore, in the detection and the electronic image stabilization, a detection condition and a stabilization condition are independently set. Thus, a more correct and appropriate electronic image stabilization can be made.

Thus, since the stabilization information in a predetermined range is extracted, the stabilization unit 41 practically extracts a plurality of stabilization information from the stabilization information recording unit 32, and stabilizes the shooting device shake of the image using the electronic image stabilization condition based on the plurality of stabilization information. For example, the stabilization unit 41 generates statistical information based on the plurality of stabilization information as the electronic image stabilization condition. As the statistical information, various types of information can be generated, but an average value, the maximum value, an equivalent data ratio (for example, the ratio of shooting device shake with shift and shooting device shake with rotation) of the plurality of stabilization information can be adopted. The statistical information to be used depends on the experience. Thus, based on lots of stabilization information, the electronic image stabilization condition converges into the value or the status by which the shooting device shake characteristic of a user of the shooting device is reflected. Therefore, the optimum electronic image stabilization depending on the shooting condition and the user of the shooting device can be performed. Similarly, the detection unit 43 extracts a plurality of stabilization information from the stabilization information recording unit 32, obtains the detection condition based on the information, and detects the shooting device shake of the image using the condition.

For example, when the shooting condition used in extracting stabilization information is "0.1" for the exposure time, "landscape" for the shooting direction, and "unused" for the AF function as shown in FIG. 5, then the shooting condition of the following relationship (predetermined relationship) is selected. That is, the shooting condition of the range of "0.1"±20% for the exposure time, the same (that is, "horizontal") for the shooting direction, and the same (that is, "unused") for the AF function is extracted.

Then, the stabilization information corresponding to the shooting condition is extracted. When the extracted number of stabilization information corresponding to the shooting condition is equal to or larger than a predetermined number, the condition for detection (detection condition) and the condition for stabilization (electronic image stabilization condition) are set using a plurality of stabilization information corresponding to the shooting condition. The predetermined number is the number enough for detecting and stabilizing the shooting device shake while customizing for the user of the shooting device, and can be empirically obtained. For example, it is 5 to 10.

Based on the detection condition and the stabilization condition, the shooting device shake is detected from the image of the image recording unit 31, and the image is stabilized. That is, as described later, the range or sequence of the detection, and the range or sequence of the electronic image stabilization (hereinafter referred to as range or sequence of the stabilization) are set.

When the extracted number of stabilization information corresponding to the shooting condition is less than the predetermined number, the detection condition and the electronic image stabilization condition (hereinafter referred to as stabilization condition) refer to a predetermined specific value (hereinafter referred to as a default value). Based on the default value, the shooting device shake is detected from the image of the image recording unit 31, and the image is stabilized. The default value specifies a common range and sequence in the detection and the stabilization set in shipping a shooting device as described later.

It is also possible that the stabilization information recording unit 32 records at least one piece of information as a shooting condition in the shooting button information, the shooting direction information, the continuous shooting interval, and the exposure time as shown in FIG. 6. It is furthermore possible that the stabilization information recording unit 32 records at least one piece of information among the width of shooting device shake, the direction of shooting device shake, the speed of shooting device shake, and the type of shooting device shake as stabilization information as shown in FIG. 6.

The width of shooting device shake indicates the number of pixels for the distance (width) of the shift of the shooting device shake of a feature point. The direction of shooting device shake indicates the direction of any axis shown in FIG. 2 for the direction (shift direction) of the shift of the shooting device shake of a feature point. The speed of shooting device shake indicates the level of the speed of the shooting device shake, and is obtained by dividing the width of shooting device shake by the exposure time. The type of shooting device shake indicates the direction of the shooting device shake of the image as displacement by shift shown in FIG. 3A or displacement by rotation shown in FIG. 3B.

The detection (generation) of shooting device shake by the detection unit 43 can be performed by, for example, a well-known process. That is, the detection unit 43 extracts an edge in the image in a well-known process from among a plurality of images recorded by the image recording unit 31, and further extracts one or more feature points from the edge of the image in a well-known process. The edge is a point (pixel or the position) at which pixel value is suddenly changed (into a predetermined value or a value equal to or larger than the first threshold). One or more feature points are selected in order from, for example, the largest change. Next, the movements of the corresponding feature points among the three images are obtained as a movement vector in a well-known process. The movement vector is detected (generated) in the shooting device shake sequence described later within the range of detection described later. The detection unit 43 knows based on the movement vector how much the entire image is shifted, and obtains the width of shooting device shake, the direction of shooting device shake, the speed of shooting device shake, and the type of shooting device shake.

The detection condition setting unit 44 extracts the shooting condition recorded together with the image from the image data in the image recording unit 31 as shown in FIG. 8, and searches the stabilization information recording unit 32 using the shooting condition. Thus, the detection condition setting unit 44 extracts the stabilization information corresponding to the shooting condition having a predetermined relationship with the shooting condition. When the extracted number of stabilization information is equal to or larger than a predetermined number, the detection condition is set based on the plurality of extracted stabilization information, and the detection condition is sent to the detection unit 43.

Similarly, the stabilization condition setting unit 42 extracts the shooting condition from the image data in the image recording unit 31, and searches the stabilization information recording unit 32 using the shooting condition as shown in FIG. 8. Thus, the stabilization condition setting unit 42 extracts the stabilization information corresponding to the shooting condition having a predetermined relationship with the shooting condition. When the extracted number of stabilization information is equal to or larger than a predetermined number, the stabilization condition is set based on the plurality of extracted stabilization information, and it is sent to the stabilization unit 41. With an increasing amount of stabilization information, the extracted number of stabilization information increases, thereby customization can be performed appropriately.

The detection unit 43 determines the range of the detection or the detection sequence (procedure) based on the detection condition from the detection condition setting unit 44 as shown in FIG. 8, and detects the stabilization information from the image data in the image recording unit 31 as shown in FIG. 8. The newly detected stabilization information is referred to as "stabilization information #N". The detection unit 43 associates the "stabilization information #N" with the shooting condition, and additively writes them to the stabilization information recording unit 32. Thus, each time shooting is performed, new stabilization information is added.

The stabilization unit 41 stabilizes at least one image of the three in the image recording unit 31 using the "stabilization information #N" from the detection unit 43 according to the stabilization range or the stabilization sequence based on the stabilization condition from the stabilization condition setting unit 42 as shown in FIG. 8. In this example, the stabilization range or the stabilization sequence and the detection range or the detection sequence are independently set. Thus, more appropriate detection and stabilization can be performed.

Figure 9:
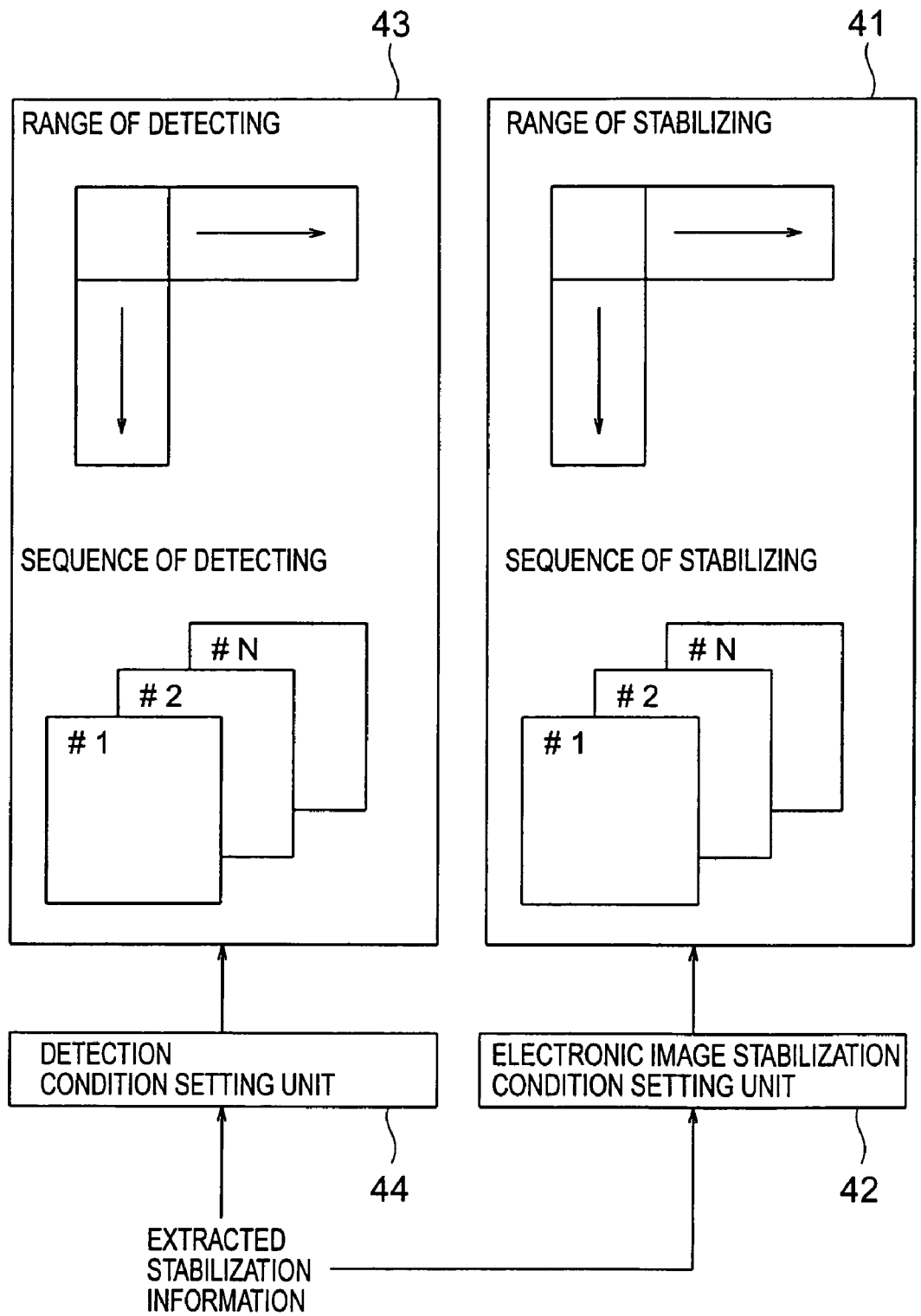

In this example, as shown in FIG. 9, in detecting shooting device shake, the detection unit 43 changes the range of detection based on the detection condition set by the detection condition setting unit 44, or changes the sequence of detection. Thus, based on the past shooting condition and the stabilization information of the user of the shooting device, it is possible to set the optimum range of detection or the sequence of detection for the shooting condition and the stabilization information of the image currently shot (image processed). As a result, the optimum user customized detection can be performed.

The range of detection is defined as ten pixels above and below and ten pixels to the left and right (20×20 pixels) of the central feature point as described above. For example, the range of the detection is set (changed) as follows. In the plurality of extracted stabilization information, when the vertical displacement relating to the direction of shooting device shake is larger and the horizontal displacement is smaller, the vertical detection range is set wider, and the horizontal detection range is set narrower. Furthermore, when a user of the shooting device indicates a large width of shooting device shake, the detection range is set wider. When a user of the shooting device indicates a smaller width of shooting device shake, the detection range is set narrower. For example, as shown in FIG. 5, when the average value of the displacement width obtained from the plurality of stabilization information is "28", and the maximum value is "38", the detection range is changed to the range of 40×40 pixels. Thus, the optimization of the detecting process is performed in the detection, and the processing time can be optimized.

The sequence of detection includes, for example, the sequence #1 of the detection of shooting device shake with shift, the sequence #2 of the detection of shooting device shake with rotation, . . . and so on, and they are sequentially performed in order on each of the three images to be processed. For example, the sequence of detection is set (changed) as follows. When the plurality of the extracted stabilization information include much "shooting device shake with shift" as the type of shooting device shake, and includes little "shooting device shake with rotation", the detecting process is limited to the sequence of detecting "shooting device shake with shift". In this case, the shooting device shake can be detected although detecting "shooting device shake with shift" is set. Thus, in detecting shooting device shake, the processing time can be considerably shortened with the sufficient functions of the detecting process reserved.

Similarly, as shown in FIG. 9, in the electronic image stabilization, the stabilization unit 41 changes the range of the stabilization or changes the sequence of the stabilization based on the stabilization information of the user recorded in the stabilization information recording unit 32. Thus, based on the past shooting condition and the stabilization information of the user of the shooting device, it is possible to set the optimum range of the stabilization or the sequence of the stabilization for the shooting condition and the stabilization information of the image currently being shot (image processed). As a result, the optimum electronic image stabilization customized for a user can be performed. The range of the stabilization and the sequence of the stabilization can be set or changed as in the case of the detection.

At the shipment of a shooting device, the range or sequence of detection and stabilization are set to common range and sequence to meet the wide shooting conditions of various users. For example, using the above-mentioned default value, a common range and sequence can be set, and the detecting process and the stabilizing process of shooting device shake with shift and shooting device shake with rotation are performed in the range of 20×20 pixels that can be anticipated as an empirically average range. Each time a user performs shooting using a shooting device, the shooting condition and the stabilization information are stored in the stabilization information recording unit 32. Thus, the amount of information used when the conditions of the detection and the electronic image stabilization are set increases. As a result, each time a shooting operation is performed, the detection and the electronic image stabilization are customized for a user.

Figure 10A:
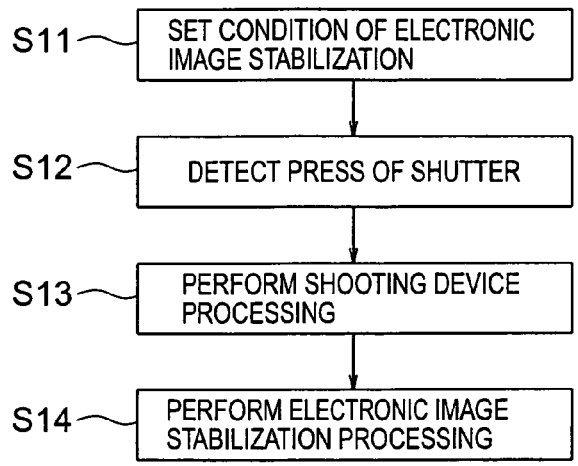
FIGS. 10A and 10B are flowcharts of the electronic image stabilization process.
Figure 10B:
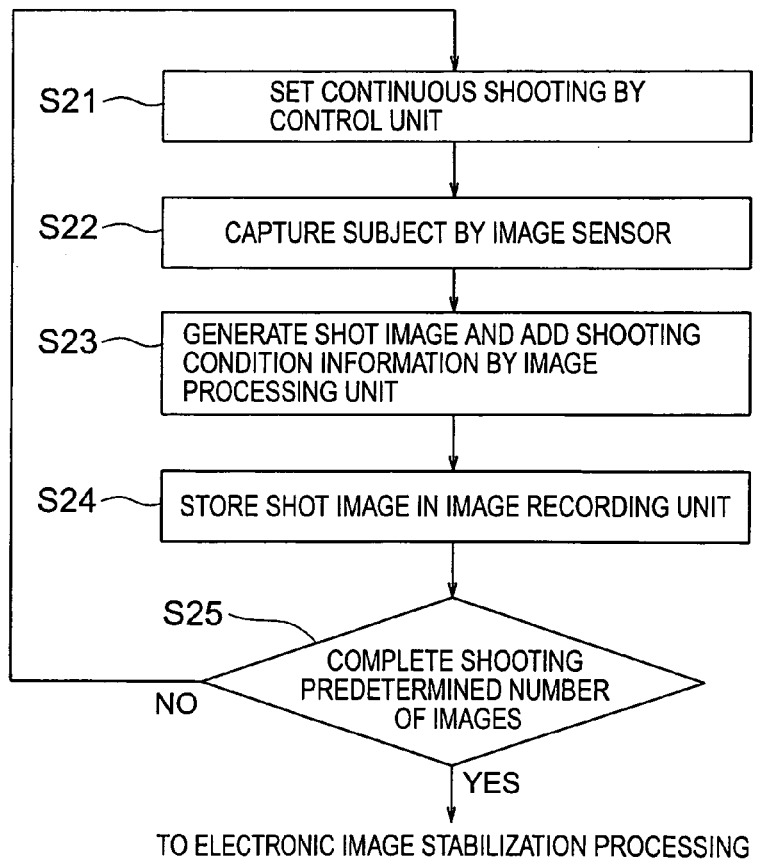

FIG. 10 is a flowchart of the electronic image stabilization process relating to the above-mentioned example. Especially, FIG. 10A is a flowchart of the shooting device shake process performed by the shooting device according to the present invention. FIG. 10B is a flowchart of the shooting device processing such as well-known camera processing performed by the shooting device processing CPU 2.

In FIG. 10A, when a user specifies a shooting mode using the display unit 5 and the operation unit 6 as shown in FIGS. 4A and 4B, the condition of the electronic image stabilization is set based on the input from the operation unit 6 (step S11), and the control unit 22 detects a press of a shutter (step S12). Then, the shooting device processing CPU 2 performs a shooting device processing (step S13), and the image processing CPU 4 performs a electronic image stabilization process (step S14). The shooting device processing is described later by referring to FIG. 10B. The electronic image stabilization process is described later by referring to FIG. 11.

In FIG. 10B, to perform electronic image stabilization, the control unit 22 sets continuous shooting (step S21), and the image sensor 1 captures a subject (image of a subject) according to the control of the control unit 22 (step S22). Based on the captured subject, the image processing unit 21 generates a shot image, adds information about the shooting condition to the generated shot image (step S23), and stores the shot image in the image recording unit 31 (step S24). The control unit 22 checks whether or not the predetermined number of images set at step S21 have been shot (step S25). When they have not been completely shot, the processes in and after step S21 are repeated. When the predetermined number of images have been shot, the control unit 22 notifies (the detection condition setting unit 44 of) the image processing CPU 4 of the information and terminates the shooting device processing. Thus, the electronic image stabilization process is started.

Figure 11:
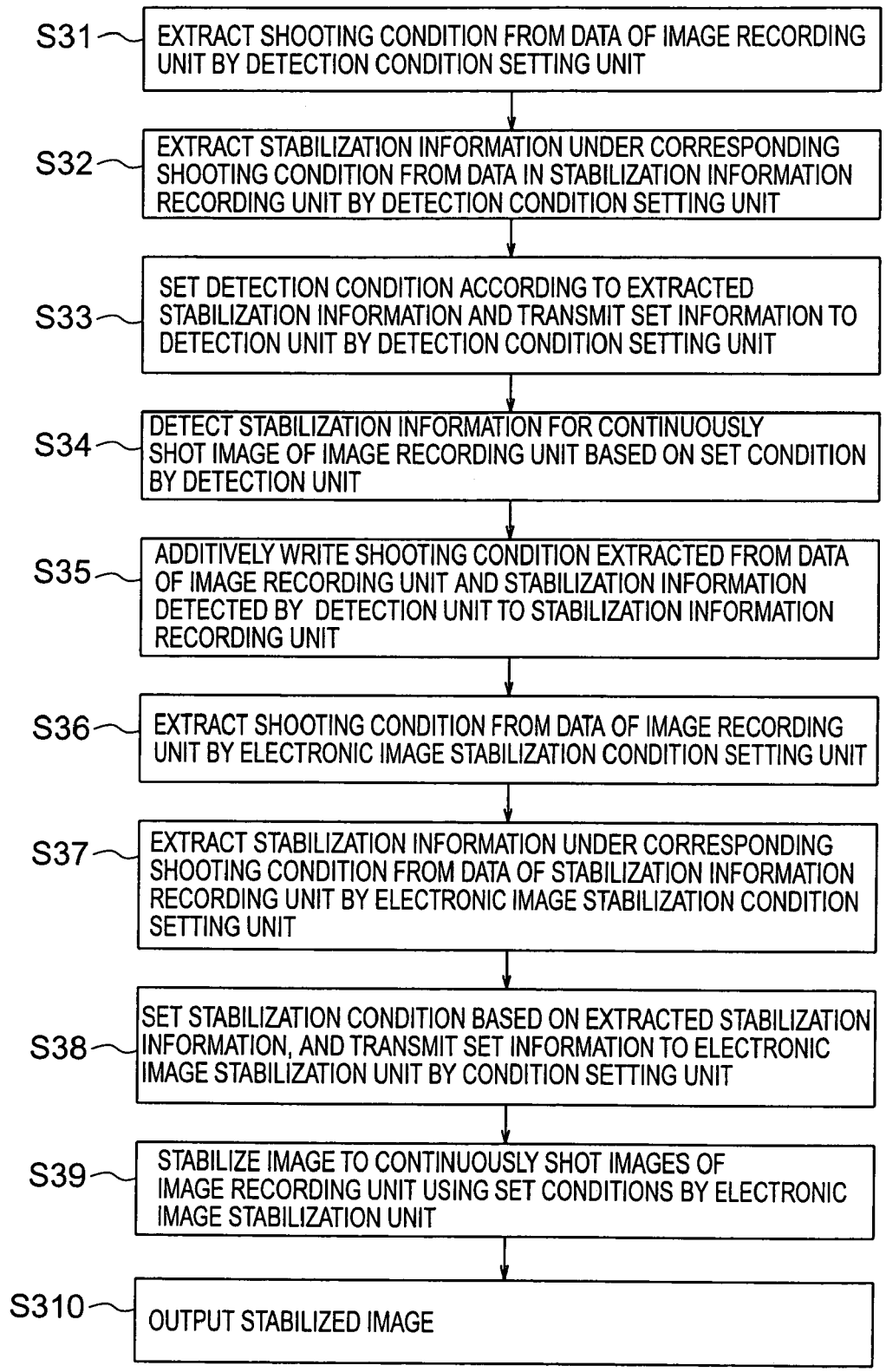
FIG. 11 is a flowchart of the electronic image stabilization process.

FIG. 11 is a flowchart of the image processing performed by the image processing CPU 4.

Upon receipt of a notification from the control unit 22, the detection condition setting unit 44 extracts the shooting condition from the information (or data) stored in the image recording unit 31 (step S31), extracts the stabilization information under the shooting condition from the stabilization information recording unit 32 based on the extracted shooting condition (step S32), sets the detection condition based on the extracted stabilization information, and transmits it to the detection unit 43 (step S33). Based on the set condition, the detection unit 43 detects (generates) the stabilization information for the continuously shot image of the image recording unit 31 (step S34), and additively writes the shooting condition extracted from the image recording unit 31 at step S31 and the detected stabilization information to the stabilization information recording unit 32 (step S35).

Next, the stabilization condition setting unit 42 extracts the shooting condition from the information stored in the image recording unit 31 (step S36), extracts the stabilization information under the shooting condition from the stabilization information recording unit 32 based on the extracted shooting condition (step S37), sets the stabilization condition based on the extracted stabilization information, and transmits it to the stabilization unit 41 (step S38). Using the set stabilization condition the stabilization unit 41 performs electronic image stabilization on a continuously shot image of the image recording unit 31 (step S39), and outputs the shooting device shake stabilized image to, for example, the display unit 5 (step S310).

When a predetermined or larger number of stabilization information have not been extracted at step S32, a default value is set as a detection condition at step S33. Thus, at step S34, by using the common range and sequence, a process of detecting shooting device shake with shift and shooting device shake with rotation can be performed on an empirically average range. At step S37, when a predetermined or larger number of stabilization information have not been extracted, a default value is set as a stabilization condition at step S38. Thus, at step S39, by using the common range and sequence, a process of stabilizing shooting device shake with shift and shooting device shake with rotation can be performed on an empirically average range.

Figure 12:
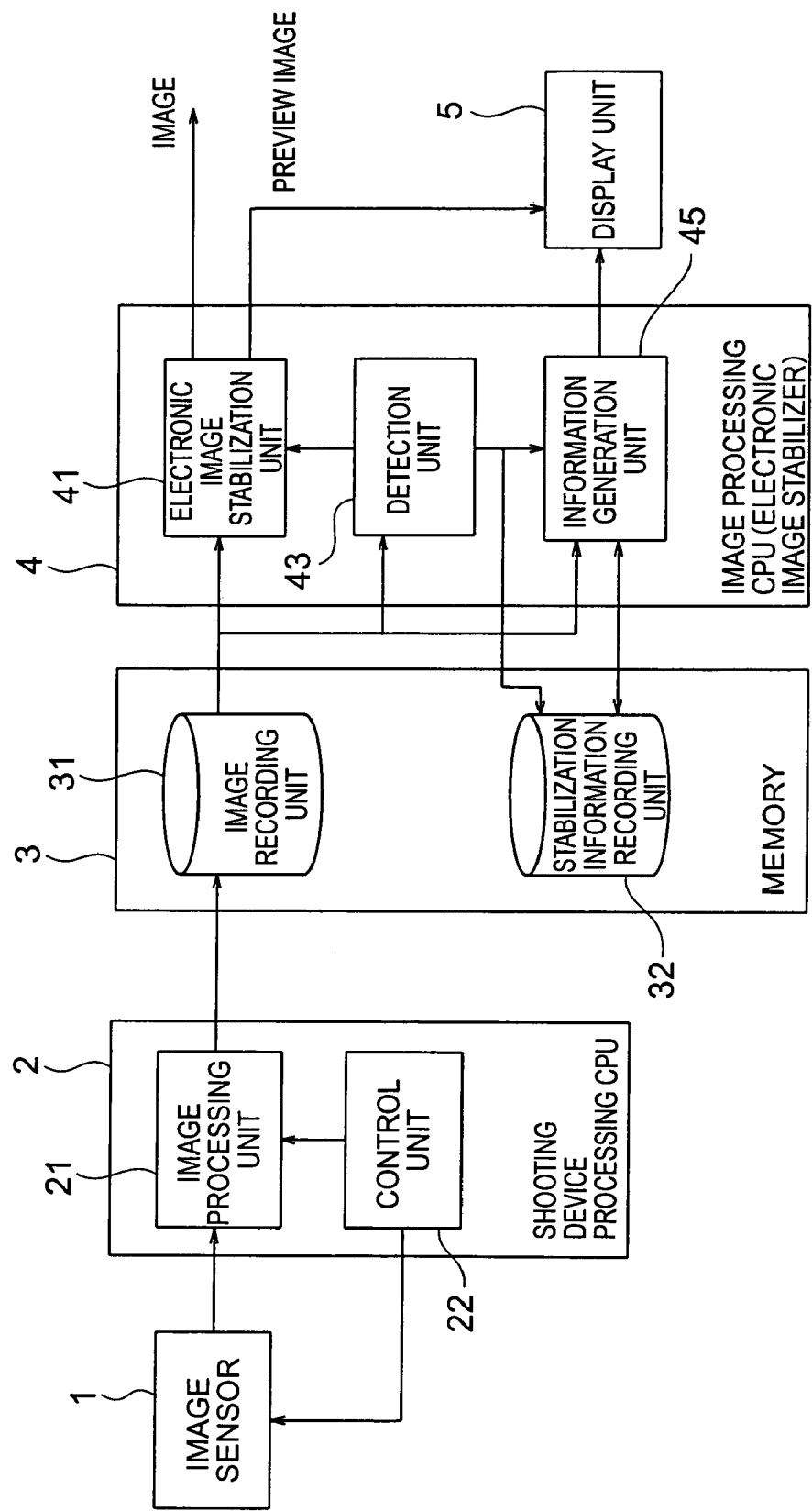
FIG. 12 shows another example of the structure of the shooting device according to the present invention.

FIG. 12 shows the structure of a shooting device, and another example of the structure of a shooting device according to the present invention. The shooting device of the example provides a user with guidance information about the protection against shooting device shake.

As a method of reducing the possibility of shooting device shake, there is a warning issued to notify a user of a status in which shooting device shake can easily occur, thereby raising attention of the user. For example, there is a method of estimating the level of the shooting device shake from the brightness of a subject and an exposure time, and displaying the level to the user (Japanese Patent Laid-open No. 2005-026888). However, with the same brightness and the same exposure time, the level of generated shooting device shake depends on a user. Therefore, the level of the shooting device shake suitable for a specific user cannot always be estimated only from the brightness of a subject and an exposure time. Furthermore, the sufficient information to prevent shooting device shake cannot be provided for a user only by displaying the level of shooting device shake.

In this example, the shooting device includes an information providing unit for guidance information in addition to the structure shown in FIG. 1. The information providing unit may include the stabilization information generation unit 45 and the display unit 5. The information providing unit provides for a user guidance information about protection against shooting device shake based on the information from the stabilization information recording unit 32. In FIG. 12, the stabilization condition setting unit 42, the detection condition setting unit 44, and the operation unit 6 are omitted.

The stabilization information generation unit 45 of the information providing unit generates guidance information about the protection against shooting device shake based on the detected stabilization information, and provides the generated information for a user by displaying the information on the display unit 5. It can be provided for a user by other means, for example, by outputting voice.

In this example, the stabilization information generation unit 45 identifies the type of shooting device shake. Based on this, the unit provides (outputs) a user with the type of the occurred shooting device shake and the guidance information for protection against the occurrence of the shooting device shake as shown in, for example, FIGS. 13A and 13B. Thus, the user can realize the type of shooting device shake that has occurred and take appropriate countermeasures. Therefore, by providing the guidance information based on the results of the occurrence of the shooting device shake, the user can consider the protection against the shooting device shake and enhance the effect of the stabilization of the shooting device shake.

The stabilization information generation unit 45 generates the guidance information for the (current) shot image and the subsequent shooting based on the stabilization information received from the detection unit 43 or the information from the stabilization information recording unit 32. The image shooting can be performed by continuously shooting three images as shown in FIG. 5 or shooting only one image, and then extracting stabilization information by other device.

The timing of providing the guidance information for a user is the time of previewing an image or the time of shooting an image. Even after an image is shot, a user can be aware of shooting device shake at the next shooting by repeating the provision. The guidance information can also be stored so that it can be called from the menu and outputted. The output timing of the guidance information can also be set by a user.

In this example, the user stabilization information can be a width of shooting device shake, a direction of shooting device shake, and a speed of shooting device shake. In this case, the guidance information based on the width of shooting device shake, the direction of shooting device shake, and the speed of shooting device shake can be provided for a user. Therefore, the stabilization information generation unit 45 can provide the guidance information based on at least one piece of information among a width of shooting device shake, a direction of shooting device shake, a speed of shooting device shake, and a type of shooting device shake.

Furthermore, the stabilization information generation unit 45 can provide the guidance information based on the stabilization information in the preview status and the information from the stabilization information recording unit 32, and can provide the guidance information based on the exposure time in the preview status and the information from the stabilization information recording unit 32, and furthermore can provide the guidance information based on the stabilization information corresponding to the user shooting result and the information from the stabilization information recording unit 32.

When the stabilization information recording unit 32 stores an exposure time as a condition during shooting, the exposure time at the preview can be compared with the past stabilization information relating to a user (width of shooting device shake, direction of shooting device shake, speed of shooting device shake, or type of shooting device shake) read from the stabilization information recording unit 32 to determine the possibility of shooting device shake, and generate the guidance information about the protection against shooting device shake.

When zoom information, shooting button information (autofocus information), shooting direction information, and continuous shooting interval are recorded as a condition of a shooting time in the stabilization information recording unit 32, and when the image processing unit 21 records in part of image data the zoom information, the shooting button information, the shooting direction information, and the continuous shooting interval as a condition at the shooting, then the shooting condition information at the preview is compared with the information about the past shooting condition of a user and the stabilization information (width of shooting device shake, direction of shooting device shake, speed of shooting device shake, or type of shooting device shake) read from the stabilization information recording unit 32, the possibility of shooting device shake is determined corresponding to the shooting condition, and the guidance information about the protection against shooting device shake can be generated corresponding to the shooting condition.

Figure 14:
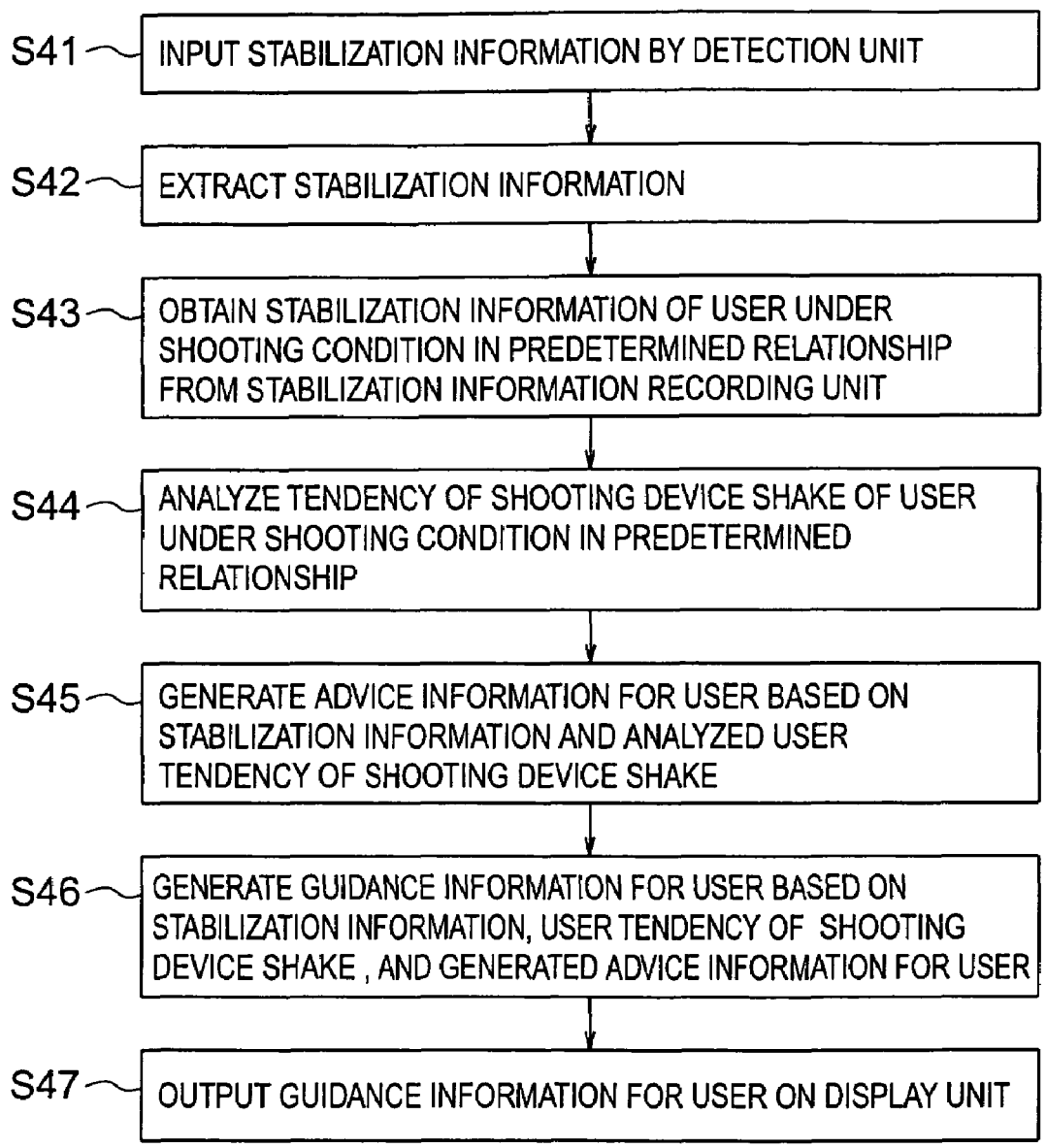
FIG. 14 is a flowchart of the guidance information display process of electronic image stabilization.

FIG. 14 is a flowchart of the process of the guidance information about a electronic image stabilization in this example. The process shown in FIG. 14 is performed immediately after step S14 shown in FIG. 10A (that is, after the process shown in FIG. 11). The process in FIG. 14 can be performed parallel to step S310 shown in FIG. 11.

The detection unit 43 inputs shot image and detected stabilization information to the stabilization information generation unit 45 of the information providing unit (step S41). In response to this, the stabilization information generation unit 45 extracts the stabilization information from the image and the stabilization information (step S42), obtains the stabilization information under the shooting condition in a predetermined relationship from the stabilization information recording unit 32 (step S43), analyzes the tendency of a user under a shooting condition in the predetermined relationship (step S44), generates advice information for the user based on the stabilization information obtained in step S42 and the analysis result (step S45), generates the guidance information for the user shown in FIG. 13 based on the shake information, the analysis result and the advice information (step S46) and outputs the information on the display unit 5 (step S47).

The present invention has been explained above based on the embodiments of the invention, but the present invention can be varied within the scope of the gist of the invention.

For example, in this specification, a shooting device can be a capture device that captures an image when a shutter button is pressed, and electronically holds and outputs the image as digital data. In this specification, the shooting device can also be provided with a portable telephone or a portable information terminal. The present invention can effectively stabilize shooting device shake in a small device that cannot perform optical stabilization such as a sensor shift, a lens shift and so on. because the space for implementation is very small.

The stabilization information can also be detected in other methods without using continuously shot images. The stabilization information can also be detected in other methods without detecting a movement vector when continuously shot images are used.

When "NO" is selected for customization in FIG. 4A, a electronic image stabilization can be made to a shot image, but the customization can be omitted. In this case, the electronic image stabilization can be performed in the electronic image stabilization process by a standard value provided by the stabilization unit 41 in advance, or in the electronic image stabilization process based on the stabilization information customized up to that time.

As explained above, according to the present invention, in a shooting device, a electronic image stabilization method, and a electronic image stabilization program, a electronic image stabilization is made based on the stabilization information and a shooting condition. Therefore, the electronic image stabilization can be customized based on various types of individuality of a user and various types of shooting conditions, and the optimum electronic image stabilization can be made for the user.

Therefore, for example, a electronic image stabilization can be made to a shooting device with a higher pixel resolution, higher zoom magnification, smaller, and lighter unit, and especially to a digital camera implemented on the portable telephone even when an image is shot in the dark without a flash. Furthermore, shooting device shake can be stabilized even when the shooting device shake characteristic during shooting a subject using a shooting device depends on a user, the shape of the shooting device, and the use of the shooting device by the user.

Thus, according to the present invention, a desired electronic image stabilization effect can be obtained, an unnatural stabilization to a shot image can be prevented, and a stabilization can be made in a comparatively short time. As a result, a electronic image stabilization effect with which a user can be satisfied is obtained, and an unnatural stabilization effect or the accumulation of stress can be avoided.

What is claimed is:

1. A shooting device, comprising:
   a capture unit capturing an image of a subject;
   a detection unit detecting stabilization information from the image;
   a stabilization information recording unit associating a shooting condition during shooting with the detected stabilization information and recording the shooting condition and the stabilization information; and
   an electronic image stabilization unit extracting the stabilization information corresponding to the shooting condition having a predetermined relationship with the shooting condition by referring to the stabilization information recording unit using the shooting condition, and stabilizing the shooting device shake based on the extracted stabilization information.

2. The shooting device according to claim 1, further comprising:
   a control unit controlling the capture unit;
   an image processing unit recording an image shot by the capture unit in an image recording unit recording the image,
   wherein the capture unit continuously shoots a plurality of images under control of the control unit,
   wherein the image processing unit records the plurality of continuously shot images in the image recording unit,
   wherein the detection unit detects stabilization information from the plurality of images recorded in the image recording unit, and
   wherein the electronic image stabilization unit stabilizes the shooting device shake on at least one image among the plurality of images based on the stabilization information.

3. The shooting device according to claim 2, wherein the electronic image stabilization unit extracts a plurality of stabilization information from the stabilization information recording unit using the shooting condition, and stabilizes the shooting device shake based on the plurality of extracted stabilization information.

4. The shooting device according to claim 3, wherein the electronic image stabilization unit stabilizes shooting device shake based on statistical information according to the plurality of extracted stabilization information.

5. The shooting device according to claim 1, wherein the detection unit changes a range of detecting shooting device shake based on the stabilization information of a user recorded in the stabilization information recording unit.

6. The shooting device according to claim 1, wherein the electronic image stabilization unit changes a range of stabilizing shooting device shake based on the stabilization information of a user recorded in the stabilization information recording unit.

7. The shooting device according to claim 1, wherein the detection unit changes a sequence of detecting shooting device shake based on the stabilization information of a user recorded in the stabilization information recording unit.

8. The shooting device according to claim 1, wherein the electronic image stabilization unit changes a sequence of stabilizing shooting device shake based on the stabilization information of a user recorded in the stabilization information recording unit.

9. The shooting device according to claim 1, wherein the stabilization information recording unit records at least one piece of information among a width of shooting device shake, a direction of shooting device shake, a speed of shooting device shake, and a type of shooting device shake as the stabilization information.

10. The shooting device according to claim 1, wherein the stabilization information recording unit records at least one piece of information among shooting button information, shooting direction information, a continuous shooting interval, and an exposure time as the shooting condition.

11. The shooting device according to claim 1, further comprising:
an information providing unit providing guidance information about protection against shooting device shake for a user based on information from the stabilization information recording unit.

12. The shooting device according to claim 11, wherein the information providing unit provides the guidance information based on stabilization information in a preview status and information in the stabilization information recording unit.

13. The shooting device according to claim 11, wherein the information providing unit provides the guidance information based on an exposure time in a preview status and information in the stabilization information recording unit.

14. The shooting device according to claim 11, wherein the information providing unit provides the guidance information based on stabilization information corresponding to a user shooting result and information from the stabilization information recording unit.

15. The shooting device according to claim 11, wherein the information providing unit provides the guidance information based on at least one piece of information among a width of shooting device shake, a direction of shooting device shake, a speed of shooting device shake, and a type of shooting device shake.

16. An electronic image stabilization apparatus, comprising:
a capture unit capturing an image of a subject;
a detection unit detecting stabilization information from the image;
a stabilization information recording unit associating a shooting condition during shooting with the detected stabilization information and recording the shooting condition and the stabilization information; and
an electronic image stabilization unit extracting the stabilization information corresponding to the shooting condition having a predetermined relationship with the shooting condition by referring to the stabilization information recording unit using the shooting condition, and stabilizing the shooting device shake based on the extracted stabilization information.

17. A electronic image stabilization method for stabilizing shooting device shake in a shooting device, the method comprising:
shooting an image of a subject;
detecting stabilization information from the image;
associating a shooting condition during the shooting with the detected stabilization information and recording the shooting condition and the stabilization information;
extracting the stabilization information corresponding to the shooting condition having a predetermined relationship with the shooting condition using the shooting condition; and
stabilizing the shooting device shake based on the extracted stabilization information.

* * * * *